(12) United States Patent
Takata

(10) Patent No.: US 8,098,215 B2
(45) Date of Patent: Jan. 17, 2012

(54) INFORMATION PROCESSING DEVICE, AND TRANSPARENT DISPLAY ELEMENT CONTROL METHOD AND PROGRAM

(75) Inventor: Hiroaki Takata, Kahoku (JP)

(73) Assignee: PFU Limited, Kahoku-shi, Ishikawa (JP)

( * ) Notice: Subject to any disclaimer, the term of this patent is extended or adjusted under 35 U.S.C. 154(b) by 339 days.

(21) Appl. No.: 12/547,101

(22) Filed: Aug. 25, 2009

(65) Prior Publication Data
US 2010/0045570 A1   Feb. 25, 2010

(30) Foreign Application Priority Data

Aug. 25, 2008   (JP) ................................. 2008-215472

(51) Int. Cl.
*G09G 5/00* (2006.01)
(52) U.S. Cl. .......... 345/4; 345/5; 345/6; 345/9; 345/629
(58) Field of Classification Search ........................ None
See application file for complete search history.

(56) References Cited

U.S. PATENT DOCUMENTS

| | | | |
|---|---|---|---|
| 5,590,265 A | 12/1996 | Nakazawa | |
| 6,661,425 B1 * | 12/2003 | Hiraoki | 345/629 |
| 7,587,120 B2 * | 9/2009 | Koo et al. | 385/147 |
| 2006/0197751 A1 | 9/2006 | Iijima | |
| 2008/0125219 A1 * | 5/2008 | Williams et al. | 463/31 |

FOREIGN PATENT DOCUMENTS

| | | |
|---|---|---|
| JP | 04-045487 A | 2/1992 |
| JP | 6-051738 A | 2/1994 |
| JP | 6-124183 A | 5/1994 |
| JP | 9-009137 A | 1/1997 |
| JP | 10-116174 A | 5/1998 |
| JP | 2006-244078 A | 9/2006 |

* cited by examiner

*Primary Examiner* — Muhammad N Edun
(74) *Attorney, Agent, or Firm* — Westerman, Hattori, Daniels & Adrian, LLP

(57) ABSTRACT

Provided is an information processing device which includes: a transparent display element display unit (21) that displays a transparent window in association with display position information for specifying a display position on a display (2), the transparent window being displayed as transparent at least in part such that display information covered with the transparent window is visually recognized through the transparent window; an information acquisition unit (22) that acquires the display information covered with the transparent window based on the display position information; a superimposition detection unit (27) that detects that a plurality of the transparent windows are in a positional relation in which the plurality of the transparent windows overlap one another to be displayed, based on the display position information; and a processing execution unit (28) that executes, in a case where the superimposition of the plurality of the transparent windows is detected, predetermined processing based on the display information acquired by the information acquisition unit (22).

13 Claims, 10 Drawing Sheets

REGISTER POSITIONS AND LOCK

INFORMATION PROCESSING DEVICE, AND TRANSPARENT DISPLAY ELEMENT CONTROL METHOD AND PROGRAM

CROSS-REFERENCE TO RELATED APPLICATION

This application is based upon and claims the benefit of priority of the prior Japanese Patent Application No. 2008-215472, filed on Aug. 25, 2008, the entire contents of which are incorporated herein by reference.

FIELD

The present invention relates to an information processing device connected to a display device.

BACKGROUND

Conventionally, there has been a technology in which a window with a transparent background is provided so as to make an image behind the window observable (see Patent documents 1 to 4). There has been another technology of issuing position coordinates which are designated in a window of an operation target, to another window (see Patent document 5). There has been further another technology of moving a transparent control panel by following up a change in image pickup position of a camera (see Patent document 6).
[Patent document 1] JP 6-124183 A
[Patent document 2] JP 10-116174 A
[Patent document 3] JP 6-51738 A
[Patent document 4] JP 04-045487 A
[Patent document 5] JP 2006-244078 A
[Patent document 6] JP 9-9137 A

SUMMARY

Conventionally, in a computer provided with a so-called window system, a window displayed in the computer is associated with an application having a function to be provided by using the window. In the computer, depending on the application, a main window and sub windows are displayed, and the application associated with the main window can be operated by using the sub windows. However, the sub windows may display only a limited amount of information on a display at a time, and therefore the sub windows basically display mere information, icons, and buttons on the display, which cannot be displayed by the main window alone.

In other words, heretofore, various functions have been provided by a plurality of windows mainly because of the limitation in area in which the information may be displayed, and there has been no functional necessity that the functions should be provided by using different windows. For example, when providing a predetermined function, such as a search function, it is a matter of the design of the application to determine whether the function may be provided in a main window or may be provided by opening a sub window. Alternatively, in a case of an application which allows a user to select which one of the main window and the sub window is to be used, it is a matter of the user's taste to determine which of the windows is to be used. For this reason, in a conventional information processing device, the relation between a function to be provided by using the sub window or the like and information displayed in the main window or the like has not been provided to a user in a visually recognizable manner.

In view of the above-mentioned problems, the present invention has an object to allow a user to visually recognize the relation between a function provided by using a display element such as a window and display information to be used in processing for providing the function.

In order to attain the above-mentioned object, according to the present invention, information contained in a region covered with the transparent display element is acquired, and a predetermined function is provided based on the information, to thereby allow a user to visually recognize the relation between a function provided by using a display element such as a window and display information to be used in processing for providing the function. Further, according to the present invention, predetermined processing is carried out on a condition that a plurality of the transparent display elements overlap one another, thereby making it possible to provide, by using the combinations of the plurality of the transparent display elements, a complicated function based on display information covered with the transparent display elements.

Specifically, according to the present invention, there is provided an information processing device which is connected to a display device and displays display information on the display device, the display information being associated with display position information for specifying a display position in a display area of the display device. The information processing device includes: transparent display element display means for displaying a plurality of transparent display elements on the display device in association with display position information for specifying a display position for each of the plurality of transparent display elements in the display area, the plurality of transparent display elements comprising display elements each displayed on a portion of the display area as being transparent at least in part such that display information items covered with the display elements are visually recognized through the display elements; information acquisition means for acquiring, of the display information items displayed on the display area, a display information item covered with any one of the plurality of transparent display elements, based on the display position information of the display information item and the display position information of the any one of the plurality of transparent display elements; superimposition detection means for detecting that the plurality of transparent display elements displayed by the transparent display element display means are in a positional relation where the plurality of transparent display elements are displayed as being superimposed on one another in the display area, based on the display position information associated with each of the plurality of transparent display elements; and processing execution means for executing predetermined processing by using a display information item of the display information items, which is acquired by the information acquisition means, the display information item being covered with at least one of the plurality of transparent display elements, in a case where the superimposition detection means detects that the plurality of transparent display elements are in the positional relation where the plurality of transparent display elements are displayed as being superimposed on one another in the display area.

The information processing device according to the present invention includes a computer that can be connected to a display device. The display device may include any device that displays information based on a signal output from the information processing device. The display device may include: a display device that displays a two-dimensional image, such as a liquid crystal display or a cathode ray tube (CRT) display, which has conventionally been used as a monitor for a computer; and a display device that displays a three-dimensional image to thereby attain an enhanced stereoscopic view. A display area in the display device may include a display area provided in the display device main body, and also include a configuration other than the display device main body. An example of the configuration includes a projector that projects a video image onto an area other than the display device main body.

In the present invention, the display information to be displayed by the display device includes general information, such as a character and graphics, which can be displayed by the information processing device. In displaying the information on the display device connected to the information processing device, the display information is associated with display position information for designating a display position in the display area. The display position information includes, for example, in an information processing device provided with a multiwindow system, information indicating coordinates based on which a window is displayed, a size or the like of a window, and information indicating coordinates and sizes of display elements (such as a character and graphics) to be displayed on a desktop or in a window. The information further includes information indicating coordinates of pixels. The display position information may also be specified by information on a vector and a pixel number, other than the information on coordinates and a size.

The present invention employs, of the various display elements to be displayed by the display device, a transparent display element through which display information covered with the display elements (in other words, display information laid below the display elements) can be visually recognized. The display element to be displayed by the display device includes a window in a computer provided with a multiwindow system, and also includes a display element referred to as desktop gadget or widget, which may be relocated according to an instruction from a user input through an input device such as a mouse or a keyboard.

That is, the information processing device according to the present invention may further include input reception means for receiving an input designating a display position of the transparent display element. The transparent display element display means may display the transparent display element at a display position based on an instruction received by the input reception means.

In a display device that displays a two-dimensional image, such as a liquid crystal display or a CRT display which has conventionally been used as a monitor for a computer, color information of a portion on which the transparent display element is actually displayed is adjusted by being synthesized with color information of an image displayed on a portion covered with the transparent display element (the portion corresponding to the backside of the transparent display element), and hence the image behind the transparent display element is displayed as if a user can see through the image, thereby making the portion covered by the display element visually recognizable. It should be noted that there may be adopted various methods, as a specific method of displaying the transparent display element, other than the method of adjusting color information as described above which is generally employed at present. The various methods include a method of performing three-dimensional display and a method of displaying an image on a translucent display film to thereby make the backside visually recognizable.

Also, the transparent display element according to the present invention is for providing, as in the case of the window or the desktop gadget exemplified above, a predetermined function to be attained by executing predetermined processing. The function to be provided by the transparent display element is not particularly limited as long as the function can be provided by a computer. The function to be provided by the transparent display element may be selected from among various functions including a moving image monitoring function and a searching function, an information editing function, a function of performing communication through the Internet and receiving and displaying the processing result.

The present invention is characterized in that the display information covered with the transparent display element, that is, information that is laid below the transparent display element to be seen through by a user, is acquired, and the display information thus acquired is used for a function to be provided by the transparent display element. It should be noted that the information acquisition means may extract, from among the display information items displayed in the display area, a display information item having a display position specified by using display position information associated with the display information item overlapping a display position specified by using the display position information associated with the transparent display element, to thereby acquire display information item covered with the transparent display element.

With the configuration described above, it is possible to additionally provide with ease a function to an application associated with a window or the like displayed under the transparent display element, the function not being originally provided to the application, based on the function of the transparent display element without the need of reorganizing or altering the application. Further, heretofore, a technology of displaying the transparent element as described above has been mainly used only for the purposes of increasing an information amount visually recognizable by a user and adding to the beauty. The present invention, on the other hand, by taking advantage of the characteristics that the display element can be seen through at least in part, makes it possible to dispose the transparent display element on desired information through a user operation and to allow the user to acquire the information to use the information for a predetermined function. It should be noted that the function to be additionally provided by using the present invention is not limited to a specific function, and any function may be additionally provided by using the transparent display element of the present invention, as long as the function is executed by an information processing device.

Here, the information processing device according to the present invention further includes superimposition detection means for detecting a state where a plurality of the transparent display elements displayed on the display area are in a positional relation in which the transparent display elements overlap one another, that is, a state where two ore more of the transparent display elements overlap one another and the display element of a portion covered with those transparent display elements is made visually recognizable to a user through the transparent display processing. With this configuration, the processing execution means for executing a predetermined processing for providing a predetermined function can provide the predetermined function, upon detecting that the plurality of the transparent display elements are displayed as overlapping one another. That is, the present invention makes it possible to provide, upon detecting that the plurality of the transparent display elements overlap one another on the display area, a user with a certain function based on the display information covered with the transparent display elements.

It should be noted that, in this configuration, the processing execution means may execute predetermined processing by using display information covered with two or more of the plurality of the transparent display elements, the display information being acquired by the information acquisition means. Using the display information covered with two or more of the transparent display elements means that, when the plurality of the transparent display elements overlap one another, the display information on which the plurality of the transparent display elements overlap one another is used, which allows a user to visually recognize with more ease the relation between a predetermined function to be provided and information displayed.

The predetermined function to be provided by the processing execution means may be determined based on a combination of the plurality of the transparent display elements, which are detected, by the superimposition detection means, as being superimposed on one another. With this configuration, there may be provided different functions which vary with the respective combinations of the overlapped transparent display elements, which makes it possible to additionally provide various functions based on the display information, while reducing the development man-hours, without giving consideration to data compatibility with the application or the like installed in the information processing device. For example, a transparent display element A and a transparent display element B, which provide functions upon satisfying conditions different from each other, are disposed in different display positions on a display area, so that processing to be executed in a case where a transparent display element C overlaps the transparent display element A is different in contents from processing to be executed in a case where the transparent display element C overlaps the transparent display element B, thereby providing a function with increased flexibility.

Further, the information processing device according to the present invention further includes judgment means for judging whether a processing execution condition is satisfied or not. The judgment means makes the judgment, based on the display information acquired by the information acquisition means, with respect to a processing execution condition set to at least one of the plurality of the transparent display elements detected, by the superimposition detection means, as being in a positional relation where the transparent display elements are displayed as being overlapped with one another. The processing execution means may execute the predetermined processing in a case where it is detected by the superimposition detection means that the plurality of the transparent display elements are in a positional relation in which the transparent display elements are displayed as being overlapped with one another and it is further judged, by the judgment means, that the processing execution condition is satisfied.

With this configuration, predetermined processing is executed in a case where the transparent display elements overlap one another and the processing execution condition is satisfied due to a change in the display information of a portion covered with the transparent display elements, rather than executing certain processing merely in a case where the transparent display elements overlap one another, with the result that a condition on which processing is executed may be set with flexibility. Further, different conditions may be set for executing predetermined processing, according to the respective combinations of the overlapping transparent display elements, thereby making it possible to provide a more complicated function.

The judgment means may judge that the processing execution condition is satisfied in a case where it is judged that the display information covered with the plurality of the transparent display elements has changed. The change to be judged by the judgment means may include any change occurring in information, such as a character or graphics, which can be displayed by the information processing device.

The information acquisition means may periodically acquire display information covered with the transparent display element, and the judgment means may compare in chronological order the display information acquired by the information acquisition means to thereby judge whether the display information covered with the transparent display elements has changed or not. The display information covered with the transparent display elements is periodically acquired and compared in chronological order, to thereby detect a change in the display information covered with the transparent display elements. That is, the transparent display elements provide, as a function to be provided due to an execution of the predetermined processing, a function of monitoring the display information. For example, in a case where the display information having display contents changed over time, such as a moving image, is displayed, the transparent display elements according to the present invention may be overlapped with a portion at which the display information is displayed, to thereby monitor the change in contents of the display information.

As a specific method of judging a change in the display information, it may be judged that the display information covered with the transparent display elements has changed when an amount of change obtained as a result of comparison performed by the judgment means is equal to or larger than a predetermined reference value. Here, the amount of change refers to information indicating the degree of change between the acquired display information items, and any information may be employed as the amount of change in the present invention as long as the information indicates the degree of change between the plurality of information items, the degree of change being calculated by an image comparative technology or by an information comparative technology.

Further, the information processing device according to the present invention may further include, for the purpose of notifying a user of a change in display information detected by the monitoring function, display contents changing means for changing the display of the transparent display elements, based on the judgment made by the judgment means that the display information covered with the transparent display elements has changed, to thereby notify the user of the change in the display information.

That is, the predetermined processing to be executed by the processing execution means may include a change in display of the transparent display elements according to the detection result obtained by the judgment means. Here, the change in display of the transparent display elements may refer to a change in shape and size as well as a change in color, and may also refer to such a change as to enable/disable the showing of an additional image in the transparent display elements.

Further, the information processing device according to the present invention may further include display position acquisition means for acquiring the display position of predetermined information, based on the judgment made by the judgment means that the display information includes the predetermined information. The display contents changing means may change the display of the transparent display elements only in a portion corresponding to the display position acquired by the display position acquisition means. With this configuration, it is possible to notify a user of the display position of predetermined information judged by the judgment means, of the information covered with the transparent display elements.

Still further, the information processing device according to the present invention may further include relative display position fixing means for keeping constant relative display positions among the plurality of the transparent display elements in the display area, the plurality of the transparent display elements being displayed by the transparent display element display means. With the relative positions being fixed, in a case where the display position of any one of the transparent display elements having the display positions fixed by the relative display position fixing means is moved, the display positions of the rest of the transparent display elements are also updated along therewith. That is, the present invention makes it possible to maintain the positional relation among the plurality of the transparent display elements having the relative display positions fixed. For example, in a case of moving the display positions of the transparent display elements which are required to be constantly in the fixed positional relation, there is no need to individually adjust the respective display positions of the transparent display elements, which saves a user from having to perform troublesome operations.

The relative display position fixing means may keep constant, in a case where the superimposition detection means has detected that the plurality of the transparent display elements are in the positional relation where the transparent display elements are displayed as being overlapped with one another, the relative display positions of the plurality of the transparent display elements displayed as being overlapped with one another in the display area. With this configuration, once the transparent display elements are superimposed on one another, the display positions of the superimposed transparent display elements are all automatically updated when only one of the display positions of the transparent display elements is changed, to thereby maintain the state where the transparent display elements are superimposed on one another.

The plurality of the transparent display elements displayed by the transparent display element display means each may be provided with a register portion used for registration in a case where the transparent display elements are displayed as being overlapped with one another. Due to the register portion provided to the transparent display elements, a user can visually and intuitively grasp an idea that the transparent display elements may be overlapped with one another to be used. Further, the register portion serves as an aid (guide) for registration when a user performs an operation to actually superimpose the transparent display elements on one another, whereby the user can perform the registration operation with ease.

Further, the present invention may be implemented as a method executed by a computer or a program which causes a computer to function as the respective means described above. Also, the present invention may be a recording medium storing the program, the recording medium being readable by a device such as a computer, or a machine. Here, the recording medium readable by a computer or the like refers to a recording medium for storing information such as data or a program through electric, magnetic, optical, mechanical, or chemical action, and the information can be read by a computer or the like.

For example, the present invention may be a transparent display element control method executed by a computer which is connected to a display device and displays display information on the display device, the display information being associated with display position information for specifying a display position in a display area of the display device. The computer executes: displaying a plurality of transparent display elements on the display device in association with display position information for specifying a display position for each of the plurality of transparent display elements in the display area, the plurality of transparent display elements comprising display elements each displayed on a portion of the display area as being transparent at least in part such that display information items covered with the display elements are visually recognized through the display elements; acquiring, of the display information items displayed on the display area, a display information item covered with any one of the plurality of transparent display elements, based on the display position information of the display information item and the display position information of the any one of the plurality of transparent display elements; detecting that the plurality of transparent display elements displayed in the displaying are in a positional relation where the plurality of transparent display elements are displayed as being superimposed on one another in the display area, based on the display position information associated with each of the plurality of transparent display elements; and executing predetermined processing by using a display information item of the display information items, which is acquired in the acquiring, the display information item being covered with at least one of the plurality of transparent display elements, in a case where it is detected, in the detecting, that the plurality of transparent display elements are in the positional relation where the plurality of transparent display elements are displayed as being superimposed on one another in the display area.

According to the present invention, it is possible to allow the user to visually recognize the relation between the function to be provided by using the display element such as a window and the display information to be used in processing for providing the function.

DESCRIPTION OF EMBODIMENTS

Figure 1:
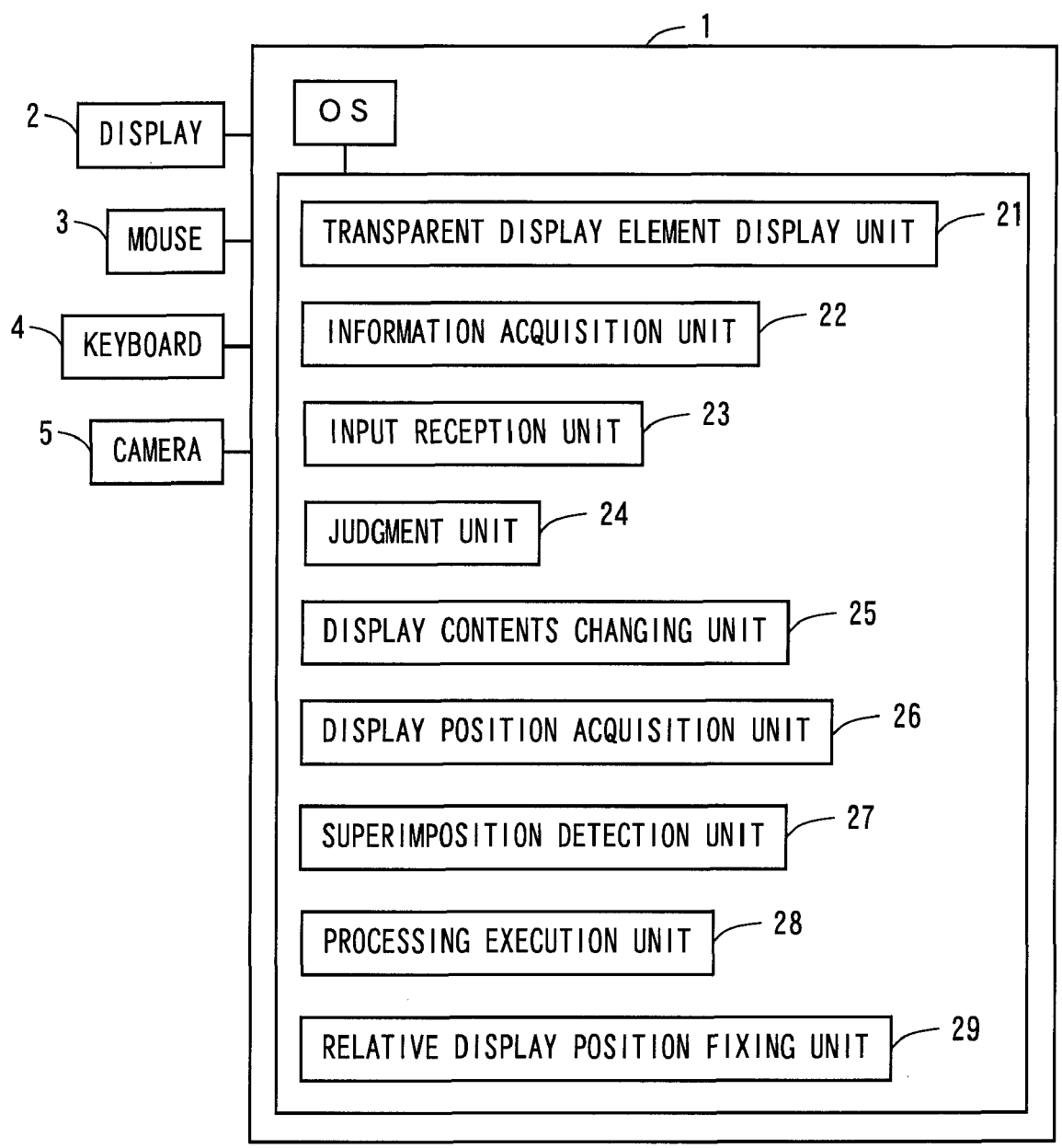
FIG. 1 is a schematic diagram illustrating a functional configuration of an information processing device according to an embodiment of the present invention.

Embodiments of an information processing device, and a transparent display element control method and program according to the present invention are described with reference to the accompanying drawings.

An information processing device 1 according to this embodiment includes a computer including a random access memory (RAM), a read only memory (ROM), a central processing unit (CPU) that controls the entire system by processing commands and data loaded on the RAM or the like, and a hard disk drive (HDD) storing various data to be used by the system, such as various programs to be loaded on the RAM. Further, the information processing device 1 is connected to a display 2 as a display device, a mouse 3 and a keyboard 4 as input devices, and a camera 5 that takes a moving image and transmits, to the information processing device 1, information on the moving image thus taken. The camera 5 may be connected via an interface such as a universal serial bus (USB) for peripheral equipment, or may be a so-called Web camera connected via a network such as the Internet.

FIG. 1 is a schematic diagram illustrating a functional configuration of the information processing device 1 according to this embodiment. According to this embodiment, the computer includes the CPU which interprets and executes a transparent display element control program loaded on the RAM or the ROM, to thereby function as the information processing device 1 including a transparent display element display unit 21 that displays a transparent window on the display 2, an information acquisition unit 22 that acquires display information covered with the transparent window, an input reception unit 23 that receives various inputs from a user, such as an input for designating a display position of the transparent window, a judgment unit 24 that judges whether or not a processing execution condition set in the transparent window is satisfied (more specifically, draws a comparison among images acquired by the information acquisition unit 22 for monitoring a moving image), a display contents changing unit 25 that changes display contents of the transparent window according to the judgment result obtained by the judgment unit 24, a display position acquisition unit 26 that acquires the display position of predetermined information covered with the transparent window, a superimposition detection unit 27 that detects that a plurality of the transparent windows are in a positional relation in which the plurality of the transparent windows overlap one another to be displayed, a processing execution unit 28 that executes, in a case where the judgment unit 24 judges that the processing execution condition has been satisfied in a state where the transparent windows overlap one another, predetermined processing associated with the transparent windows, and a relative display position fixing unit 29 that maintains constant relative display positions of the plurality of the transparent windows.

In this embodiment, the functional units described above are implemented by executing, by the CPU, respective software modules included in the transparent display element control program. Those functional units, however, may be implemented by a dedicated processor or the like. The computer according to this embodiment is managed by an operating system (OS) provided with a multiwindow system, and the transparent display element control program is installed in the computer as a search application.

The transparent display element display unit 21 causes the display 2 to display a transparent window, upon activation of the transparent display element control program. The transparent window according to this embodiment functions as a transparent display element according to the present invention, through which a window as the display element is partially or entirely transmitted to be displayed. Meanwhile, the transparent display element according to the present invention may be displayed as a user interface for providing a certain function, and may also include a so-called desktop gadget or widget, as well as an element which is normally referred to as window. The transparent window may be displayed by using an application program interface (API) of an OS, or the API of a program execution environment (for example, Adobe Air (registered trademark) or the like) installed in the OS.

The transparent window is attached with information (referred to as "window identifier" in this embodiment) for identifying the window, as in the case of other windows displayed by using a function of an OS or a program execution environment. The display position information of the window is associated with the window identifier and stored in the RAM or in the HDD. In other words, in this embodiment, the display position of the transparent window is managed by an OS or a program execution environment. Alternatively, the display position of the transparent window may also be managed by a search application itself for displaying the transparent window and providing a search function.

The information acquisition unit 22 periodically acquires at specified time intervals, of the display information displayed on the display 2, information of a portion covered by a transparent portion of the transparent window, that is, a portion that can be seen through by a user via the transparent window. Here, the information acquisition unit 22 may acquire the information of the portion covered with the transparent window as an image, or as information yet to be rendered as an image. The position information described above of the window is used for acquiring the information described above. A specific method of acquiring the information is described later.

Figure 2:
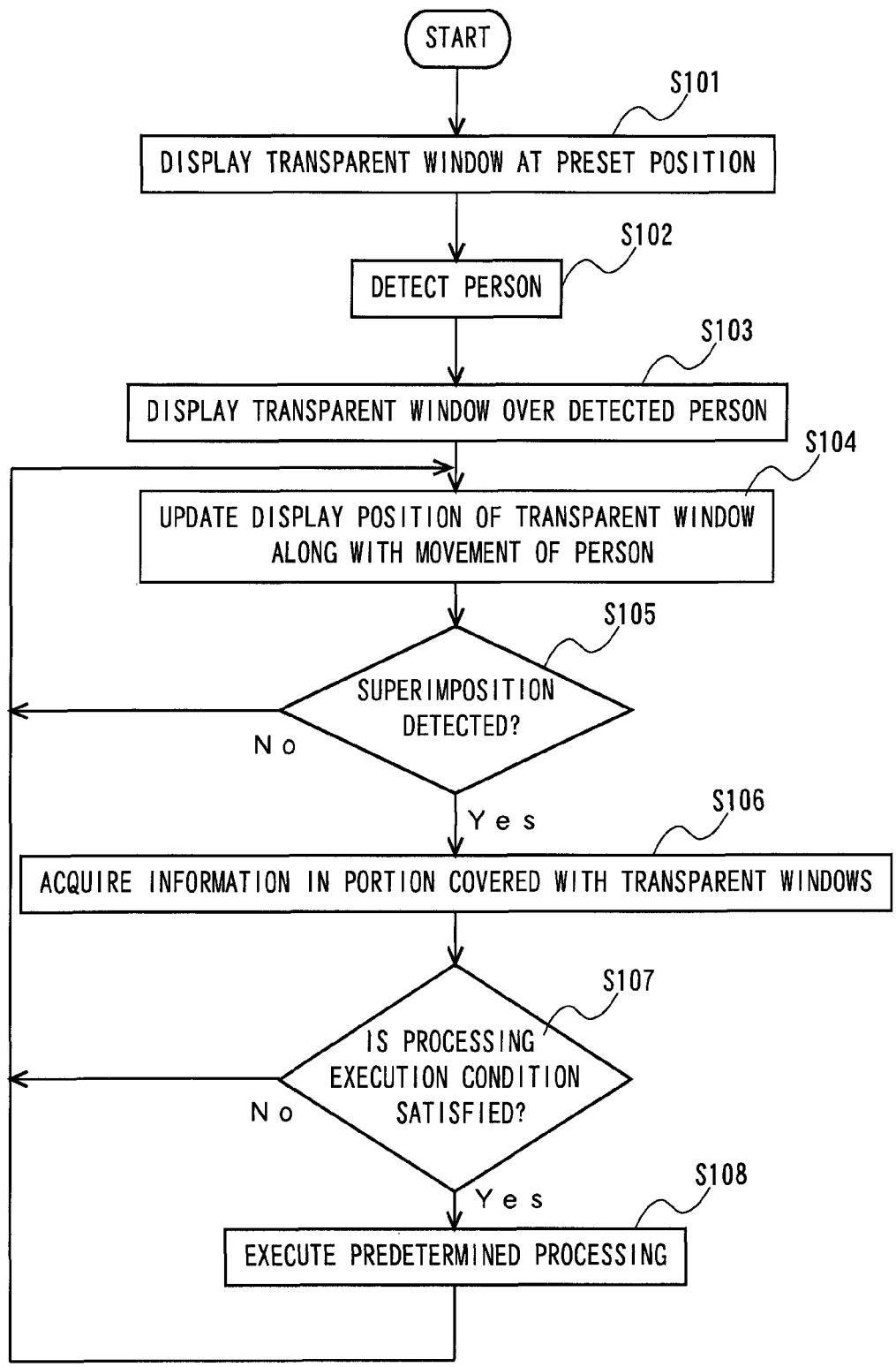
FIG. 2 is a flow chart illustrating a flow of control processing performed in a case of using a transparent window according to the embodiment of the present invention for the purpose of grasping customer behavior in a store.

FIG. 2 is a flow chart illustrating a flow of control processing in a case of using the transparent window according to this embodiment for the purpose of grasping customer behavior in a store. The processing illustrated in the flow chart is started when a user clicks an icon or the like of an application using the transparent window to instruct an OS in the information processing device 1 to activate the application. The order of the processing described below is merely an example, and a specific order of the processing may be appropriately changed according to an embodiment.

In Step S101, a transparent window is displayed. The transparent display element display unit 21 displays the transparent window such that the transparent window accounts for a partial region of the display area of the display 2. The display 2 of this embodiment includes a display device that performs display in a display area where a two-dimensional image may be displayed, and therefore the transparent display element display unit 21 acquires color information of a portion on which a transparent portion of the transparent window is superimposed, and adjusts the color information, to thereby display an image on the display 2 such that the user may partially see through the window to visually recognize the information covered by the portion. The display position of the transparent window displayed as described above is managed by being associated with the display position information indicating a display position in the display area. The display position information of the transparent window is associated with an identifier capable of identifying the window, and stored in a RAM or a HDD.

The transparent window according to this embodiment is used as being superimposed on a region where a reproduced moving image is displayed by an application for reproducing a moving image based on an input from the camera 5 connected to the information processing device 1. Accordingly, after the transparent window is displayed, the user adjusts the display position of the transparent window through the input device such as the mouse 3, to thereby move the transparent window to a position, in a region where the moving image is displayed, at which the transparent window is superimposed on a position in which the user desires to monitor a change in the image in particular. The display position of the transparent window may be changed according to a user operation input to the input reception unit 23 via the input device such as the mouse 3, or may be automatically changed according to a preset program. With this configuration, a region to be monitored may be set with flexibility, and a portion to be monitored on the display area via the transparent window for each time period may be changed.

Here, the transparent display element display unit 21 is capable of displaying a plurality of the transparent windows according to contents set in advance or contents input by the user. For example, the user gives an instruction to the input reception unit 23, through the input device such as the mouse 3, to display a new transparent window, to thereby display the desired number of the transparent windows. Also, in Step S101, the transparent window is displayed at a preset position in the display area on the display 2, while the display position of the transparent window may be changed. The display position of the transparent window may be changed according to a user operation input to the input reception unit 23 through the input device such as the mouse 3, or may be automatically changed according to a preset program. With this configuration, a portion to be monitored on the display area via the transparent window for each time period may be freely set or changed to a position desired by the user.

Figure 3:
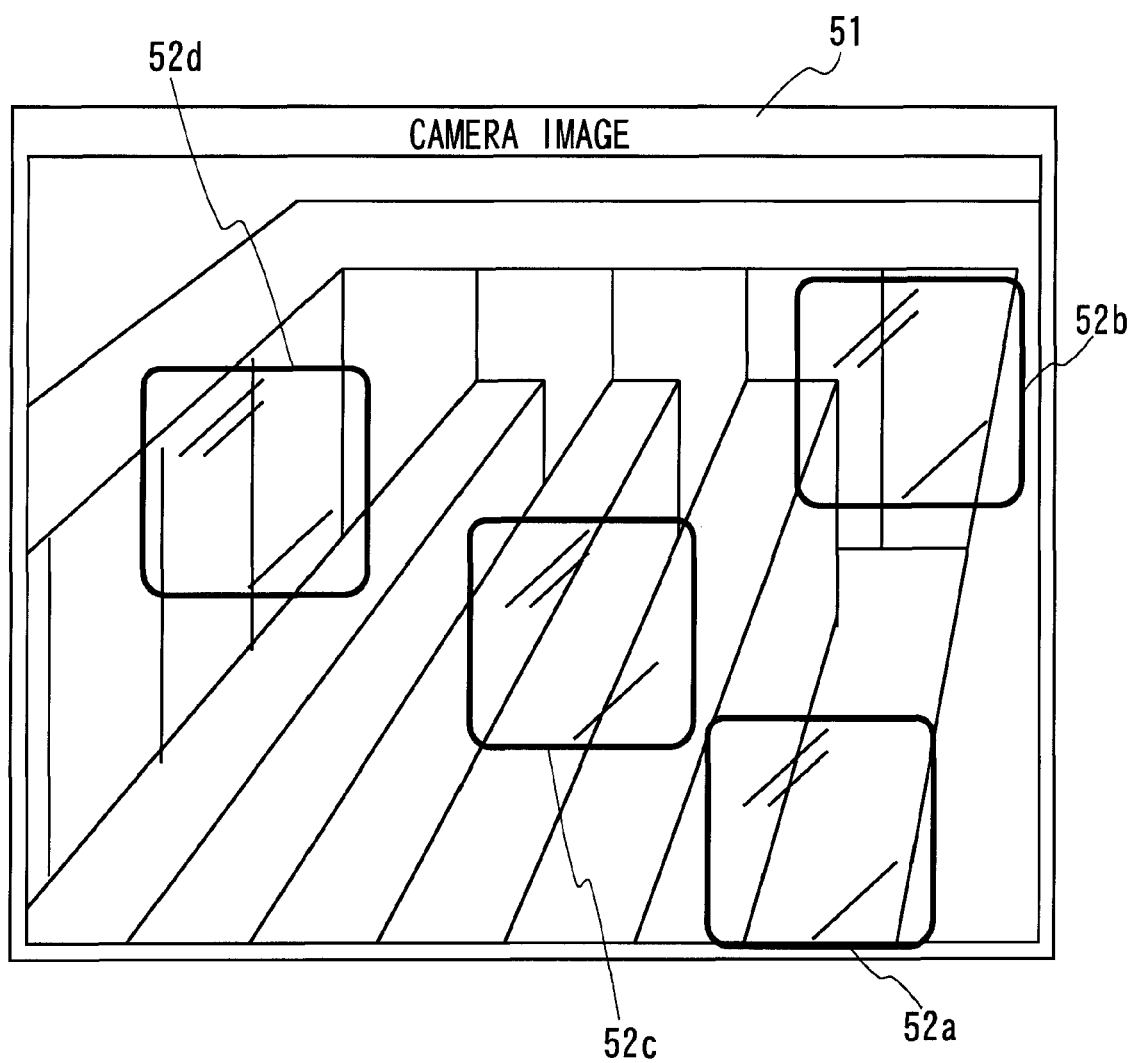
FIG. 3 is a diagram illustrating a display image of the transparent windows disposed on a moving image, according to the embodiment of the present invention.

The plurality of the transparent windows displayed by the transparent display element display unit 21 are respectively assigned functions which vary by window. FIG. 3 is a diagram illustrating a display image of the transparent windows disposed on a moving image, according to this embodiment. On the display 2, a moving image display application window 51 is displayed for displaying a moving image reproduced according to the information input from the camera 5 (in this embodiment, a moving image showing an area in a store such as a convenience store, where articles for sale are displayed), and a plurality of transparent windows 52a, 52b, 52c, and 52d are further displayed so as to cover the regions in the display area of the moving image, in which the user desires to detect a change if any. Of the transparent windows 52a, 52b, 52c, and 52d, the transparent window 52a, which is disposed at a portion where an entrance area or its vicinity of the store is displayed on the moving image display application window 51, is a transparent window for detecting entrance 52a which is assigned a processing execution condition of detecting an entrance of a customer and processing of displaying, in a case of detecting an entrance of a customer, a new transparent window to be displayed by being superimposed on the detected customer (hereinafter, the new transparent window is referred to as transparent window for person 52e).

Also, on the moving image display application window 51, the transparent windows for sales floor 52b, 52c, and 52d are displayed at portions where the store shelves are displayed, so as to be disposed at positions desired by the user. Those transparent windows for sales floor 52b, 52c, and 52d respectively have different processing execution conditions set thereto, according to the store shelf to which each of the window is disposed. For example, the transparent window for sales floor 52b is assigned a processing execution condition of performing detection when an article for sale is moved by 10 cm or more in a state where the transparent window for person 52e to be described later is superimposed thereon. The transparent window for sales floor 52c is assigned a processing execution condition of performing detection when an article for sale is moved by 20 cm or more in a state where the transparent window for person 52e is superimposed thereon. The transparent window for sales floor 52d is assigned a processing execution condition of performing detection when the transparent window for person 52e has been superimposed thereon for 1 minute or more. In this embodiment, the processing execution conditions to be set to the respective transparent windows for sales floor 52b, 52c, and 52d may preferably be varied depending on the type of the articles for sale displayed in the area where each of the transparent windows is disposed such that it is possible to detect an action (for example, to pick up one of the articles for sale, to stop and look at the articles for sale) to be taken by a customer who is interested in the articles for sale.

The transparent windows for sales floor 52b, 52c, and 52d each are further assigned respective processing to be executed when the processing execution conditions are satisfied. In this embodiment, when the processing execution conditions set to the transparent windows for sales floor 52b, 52c, and 52d are satisfied, information capable of identifying the respective articles for sale displayed on the store shelves on which the transparent windows for sales floor 52b, 52c, and 52d are disposed is additionally provided to a list of articles for sale interested associated with the transparent window for person 52e superimposed thereon. The list of articles for sale interested includes a list of articles for sale in which a customer on which the transparent window for person 52e is superimposed is interested in the store. To hold the list of articles for sale interested, information capable of identifying the article for sale (such as commodity code) is recorded in a RAM or the like.

The transparent windows according to this embodiment, which are disposed as described above, may be used, in combination with an application for displaying a moving image from the camera 5, as a system to be employed for a purpose of grasping customer behavior. That is, the camera 5 is installed to pick up an image of a predetermined area, and the transparent windows are superimposed on regions on the display 2, the regions each displaying areas where the user desires to detect door movements, coming and going of customers traffic, and the like, whereby the regions desired to be subjected to detection may be freely set in a visually recognizable manner, and it is possible to detect a movement if any in the regions desired to be subjected to detection. Then, the processing proceeds to Step S102.

In Steps S102 and S103, a person entering the store is detected, and the transparent window is displayed as being superimposed on the detected person. The information processing device 1 periodically acquires display information covered with the transparent window for detecting entrance 52a to detect a change in the display information, to thereby detect an entrance of a customer to the store (Step S102). At this time, in this embodiment, a display position of the head of the person entering the store is acquired. To acquire the display position of the head, the outline or each of the regions of the person is estimated based on the content of the detected change in the display information, and a position corresponding to the head may be acquired. Alternatively, in a case of acquiring the display position of the head of a dark-haired person, for example, a black portion having a shape similar to a head may be estimated as the head region in the display information in which a change has been detected, and the display position thereof may be acquired. Specific details of the processing for detecting a change in display information covered with the transparent window are described later. When an entrance of a customer to the store is detected, the transparent display element display unit 21 displays a new transparent window (transparent window for person 52e) focusing on the display position of the head of the person detected in Step S102 (Step S103). Then, the processing proceeds to Step S104.

Figure 4:
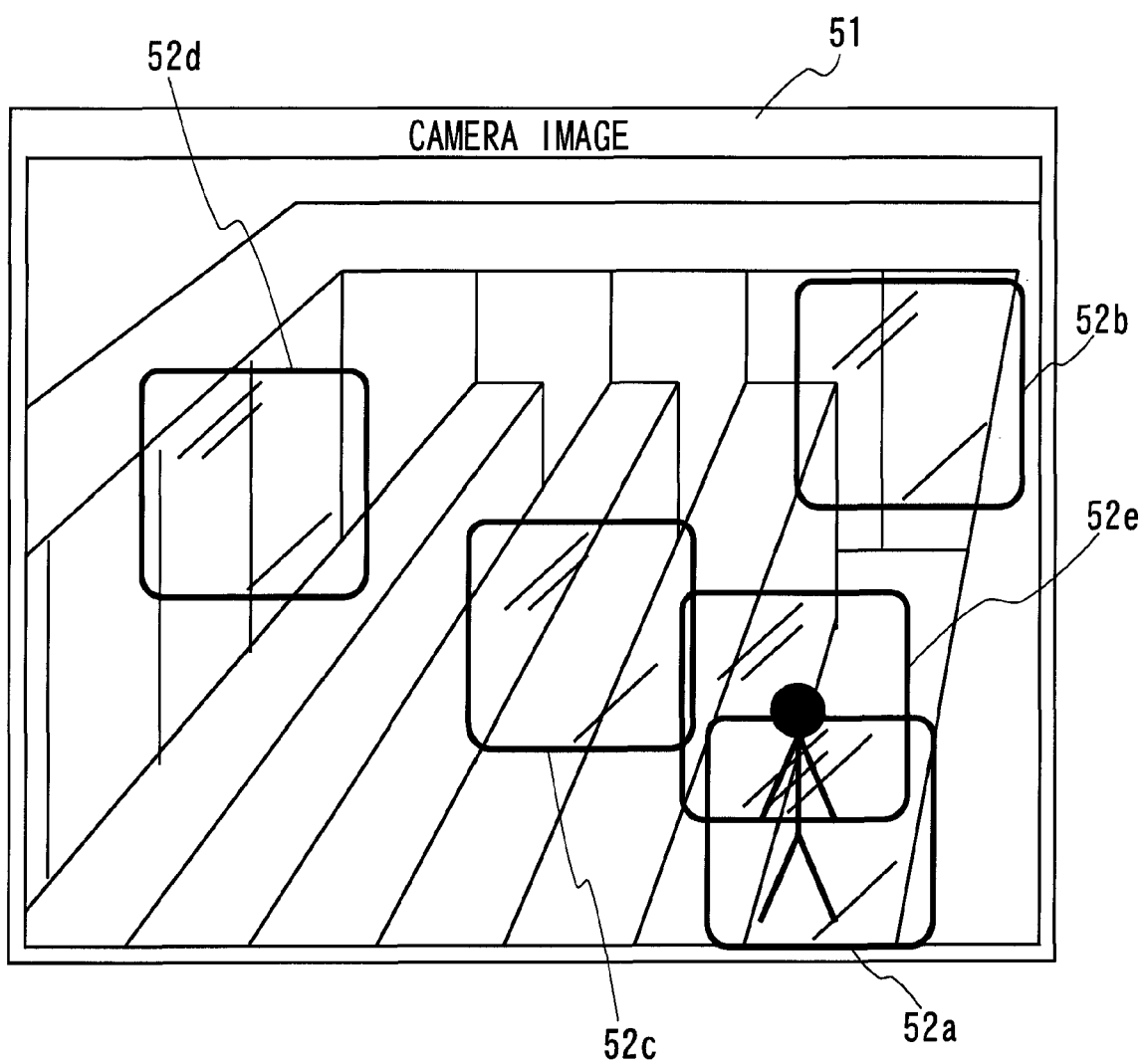
FIG. 4 is a diagram illustrating a display image of the transparent windows including a transparent window for person 52*e* disposed on a moving image, according to the embodiment of the present invention.

FIG. 4 illustrates a display image of the transparent windows including the transparent window for person 52e, which are disposed on a moving image, in this embodiment. The display 2 has a moving image display application window 51 displayed thereon for reproducing a moving image based on the information input from the camera 5 and displaying the moving image. The display 2 further has a plurality of the transparent windows 52a, 52b, 52c, and 52d displayed thereon, which are disposed so as to cover regions desired to be subjected to detection of a change, of the display area of the moving image. Here, the transparent windows 52a, 52b, 52c, and 52d are substantially similar to those described with reference to FIG. 3, and therefore the description thereof is omitted. In the display image of FIG. 4, a transparent window for person 52e is additionally provided to be displayed, which is displayed by being superimposed on the person detected by using the transparent window for detecting entrance 52a.

In Step S104, the display position of the transparent window is updated along with the movement of the person. The information processing device 1 periodically acquires, from the display information covered with the transparent window for person 52e which is newly displayed in Step S103, the display position of the head of the person, and updates the display position of the transparent window for person 52e so that the acquired display position is focused in the transparent window for person 52e. Through the processing as described above, on the display 2, the transparent window for person 52e is displayed as being moved so as to be always superimposed on a person along with the movement of the person on which the transparent window for person 52e is superimposed. Then, the processing proceeds to Step S105.

In Step S105, it is judged whether the transparent window for person 52e is superimposed on any one of the transparent windows for sales floor 52b, 52c, and 52d. The superimposition detection unit 27 compares the display position information of the transparent window for person 52e, the information being associated with the transparent window for person 52e, with the display position information of the respective transparent windows for sales floor, the information being associated with each of the respective transparent windows for sales floor 52b, 52c, and 52d, and judges whether there are any regions overlapping one another in the display area of the display 2, to thereby detect the positional relation in which any one of the transparent windows for sales floor 52b, 52c, and 52d overlaps the transparent window for person 52e to be displayed in the display 2. In a case where the superimposition of the transparent windows is detected, the processing proceeds to Step S106. In a case where no superimposition of the transparent windows is detected, the processing proceeds to Step S104. In other words, the processing in Steps S104 and S105 is repeated until the superimposition of the transparent windows is detected.

In Steps S106 and S107, information on a region covered with the transparent windows is acquired, and it is judged, with respect to one of the transparent windows for sales floor that has overlapped the transparent window for person 52e, whether the processing execution conditions respectively set to the transparent windows for sales floor 52b, 52c, and 52d are satisfied. In this embodiment, information is acquired for a region on which the transparent window for person 52e and one of the transparent windows for sales floor overlap each other. However, depending on embodiments, the information may be acquired for a region covered only by the transparent window for sales floor superimposed thereon. As described above, the processing execution condition includes, for example, in a state where the transparent window for person 52e is superimposed on the transparent window for sales floor, a condition in which an article for sale displayed in a region covered with the transparent window for sales floor on which the transparent window for person 52e is superimposed is moved by a predetermined distance or more, and a condition in which the transparent window for person 52e has been superimposed on the transparent window for sales floor for a predetermined period of time or more.

It should be noted that the processing execution condition may have various conditions set thereto depending on a purpose for which the transparent window according to the present invention is used. For example, there may be set, as the condition, a condition where a predetermined character string or symbol appears in the transparent window, or a condition where there is no change (no movement of displayed objects) in the transparent window. Various conditions may be set as the processing execution condition, as long as the conditions are based on the relation among the transparent windows or on the display content on the display 2. In this embodiment, a description is given later of processing of detecting a movement of an article for sale in a case where the processing execution condition is set as a condition in which an article for sale displayed in a region covered with a transparent window for sales floor on which the transparent window for person 52e is superimposed is moved by a predetermined distance or more. In a case where it is judged that the processing execution condition is satisfied, the processing proceeds to Step S108. In the case where the processing execution condition is not satisfied, the processing proceeds to Step S104. In other words, the processing from Step S104 to Step S107 is repeated until the processing execution condition is satisfied.

In Step S108, predetermined processing set in advance is performed with respect to the transparent window for sales floor which overlaps the transparent window for person 52e. In this embodiment, the processing of additionally providing, to the list of articles for sale interested associated with the transparent window for person 52e which is superimposed on the transparent window for sales floor, information capable of identifying the articles for sale displayed on the store shelf on which the transparent window for sales floor is disposed is performed. Then, the processing illustrated in the flow chart is ended.

The list of articles for sale interested is stored in a HDD or the like in association with customer demographics (including genders and age groups) which are input at the cash register in account, for later use in finding out, for each of the customer demographics, an article for sale interested in the store and a behavior pattern in the store. There may be executed another processing, rather than the processing of additionally providing information on an article for sale to the list of articles for sale interested, in the case where the transparent window for person 52*e* is superimposed on the transparent windows for sales floor and it is judged that the processing execution condition is satisfied. For example, information for identifying an article for sale which is picked up by a customer and is not put back to the store shelf may be additionally provided to a purchase list associated with the transparent window for person 52*e*, and the purchase list is finally cross-checked with the items actually purchased at the cash register, to thereby utilize the information for security purposes in the store.

The transparent window according to this embodiment may be used for various purposes, other than the purpose of grasping customer behavior. For example, the transparent window may be used for the purpose of managing operating procedures or component shelves in a factory or the like, for the purpose of managing store shelves, managing inventory, and for the purpose of security in a store or the like. In a case of using the transparent window for managing operating procedures, for example, the transparent windows are superimposed on the operating positions and the workers regarding a product, so as to monitor whether components are moved in a predetermined sequence of operation in the transparent windows at the respective working positions and to check whether the number and the selection of the components are right or wrong, whereby the operating procedure is managed. In the case of using the transparent window for managing component shelves, the transparent windows are superimposed on the storage spaces of the respective components, and a change in the transparent windows is detected in a predetermined order while it is checked whether the number and the selection of the components moved in the transparent windows overlapping the respective storage spaces are right or wrong, thereby managing that the components are used in a predetermined order. Further, the transparent window according to this embodiment may be used for information other than information on a moving image. For example, the transparent window according to this embodiment may also be used for monitoring an update status even in a document including characters and still images.

The content of processing to be executed in a case where the judgment unit 24 has judged that the processing execution condition is satisfied may be determined based on the combination of the transparent windows. According to the description of the flow chart, the processing of additionally providing article identification information to the list of articles for sale interested is similarly executed regardless of the transparent windows in the case where the processing execution condition is satisfied. However, there may be set different processing to be executed, depending on which of the transparent windows for sales floor 52*b*, 52*c*, and 52*d* overlaps the transparent window for person 52*e*, in the case where the processing execution condition is satisfied. For example, there may be executed any one of the processing of additionally providing information to the list of articles for sale interested and the processing of additionally providing information to the purchase list, in the case where the processing execution condition is satisfied, depending on the transparent window for sales floor 52*b*, 52*c*, or 52*d* which overlaps the transparent window for person 52*e*. To differentiate the content of the processing to be executed depending on the combination of the transparent windows, the combinations of the window identifiers are associated with the information for identifying the processing content and stored in a RAM or the like, and the information thus stored is referred to when executing the processing. However, a specific method of implementing the processing is not limited to the example described above, and the processing may be implemented by any method appropriately selected from various known methods, depending on the embodiment.

Figure 5:
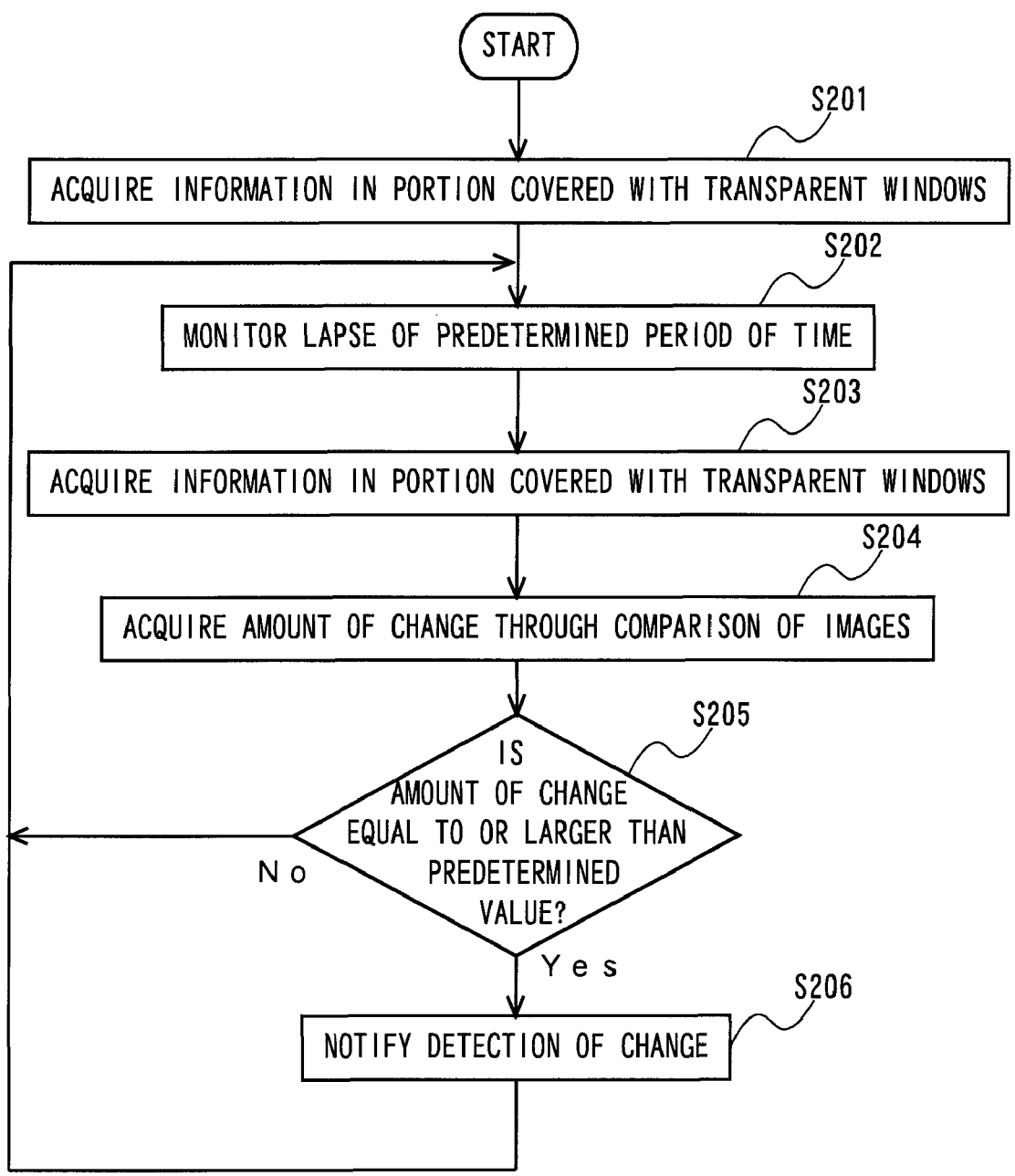
FIG. 5 is a flow chart illustrating a flow of processing for detecting a change in display information according to the embodiment of the present invention.

Next, a specific description is given of a flow of processing of detecting a change in display information covered with the transparent window in this embodiment. FIG. 5 is a flow chart illustrating a flow of processing of detecting a change in display information according to this embodiment. The processing illustrated in the flow chart is executed in a case of detecting a change in display information covered with the transparent window, for example, in a case of detecting a person or a case of detecting that an article for sale is moved in Steps S102, S106, and S107 illustrated in FIG. 2. The order of processing described below is merely an example, and a specific order of the processing may be appropriately changed according to the embodiment.

In Step S201, information on a region covered with the transparent window is acquired. Specifically, the information acquisition unit 22 extracts, of display information items displayed on the display 2, a display information item contained in the display position of a transparent window which is desired to be subjected to detection, to thereby acquire information on the region covered with the transparent window. This embodiment assumes a system in which the transparent windows are superimposed on a moving image displayed based on an input from the camera 5, to thereby grasp a situation in a shop, and therefore the display information is acquired as an image formed of a group of pixels. However, the transparent window according to the present invention may be used as being superimposed on display information other than a moving image, and the display information may be acquired as information yet to be rendered as an image, such as vector data or text codes for rendering an image.

In the case of acquiring information on a region covered with the transparent window as an image, the information acquisition unit 22 cuts out a portion from image information rendered to be output to the display 2, the portion corresponding to the region indicated by the display position information (such as coordinate and size) on the transparent window, to thereby acquire the information. In a case where the information is acquired as an image, the acquired image may be converted into character information or the like by using a character recognition technology from an image, which is used in optical character recognition (OCR) or the like, before being subjected to search processing described later. Also, in a case where the information is converted into character information by using the character recognition technology, the character information acquired as the result of the conversion is stored in association with the position information on the positions at which images of the characters related to the character information are displayed.

Alternatively, in the case of acquiring information on a region covered with the transparent window as information yet to be rendered as an image, the display position of the display information is specified by using display position information of the respective windows or the display position information of the respective elements on a desktop or in a window, which is stored in a RAM or a HDD, and display information which has a specified display position included in the display position of the transparent window is acquired. For example, to determine a display position of a specific element displayed in a certain window, the display position information of the window and the display position information of the element in the window are combined with a format of position information for calculation, to thereby determine the display position. Alternatively, in a case of an application which returns, as a return value in response to designation of display position information, information displayed on a region corresponding to the designated position, the display information in a window related to this application may be acquired through an inquiry made to the application by designating position information. When the information on a region covered with the transparent window is acquired by the information acquisition unit 22, the processing proceeds to Step S202.

In Steps S202 and S203, a lapse of a predetermined period of time is monitored by acquiring time information based on a clock (not shown) provided to the information processing device 1, and information on a region covered with the transparent window is acquired. For example, time information acquired from the clock as a reference is compared with time information acquired afterwards to calculate the elapsed time, to thereby monitor a lapse of a predetermined period of time. Then, the processing proceeds to Step S204.

In Steps S204 and S205, images are compared with one another in a chronological order, to thereby judge whether there has been any change equal to or larger than a predetermined amount of change. The judgment unit 24 compares a first image as display information acquired immediately before with a second image as display information acquired prior to the first image, to thereby acquire an amount of change between the images (Step S204). That is, in the first comparison, the image acquired in Step S201 is compared with the image acquired in Step S203, and thereafter, the processing is repeated such that the images acquired in Step S203 at predetermined time intervals are compared with one another. Here, the amount of change between the images may be calculated as a difference in image information by simply comparing parameters (information indicating color and luminance) relating to the pixels of the images. Alternatively, there may be employed a more sophisticated technology of detecting, for example, a movement of an object between two images, such as an information comparative technology or an image comparative technology, and an amount of the movement of the object may also be acquired as the amount of change. In order to acquire the amount of change, there may be employed various information comparative technologies and image comparative technologies which have conventionally been used. It is possible to detect a character string more instantly as the predetermined period of time for monitoring is set shorter, whereas the load to be imposed on the information processing device 1 increases. Therefore, it is preferred that the predetermined period of time for monitoring be appropriately set according to the processing capacity or a load status of the information processing device 1.

As more specific means for calculating the amount of change, there may be employed, for example, means for calculating an amount of change in barycenter of color. The amount of change in barycenter of color may be calculated with a smaller load with quick response, and therefore suitable for comparing images acquired from a moving image. In this embodiment, an acquired image is divided into three primary colors (red, green, and blue), and barycenters of the respective colors in the acquired image are determined. Then, the barycenters are compared among the plurality of the images as comparison targets, to thereby calculate the amount of change. For example, in a case where a certain object enters a region covered with the transparent window (in a case where an object in flesh color enters, red of the three colors is greatly changed in barycenter), or in a case where a certain object moves in a region covered with the transparent window, the barycenter of the color corresponding to the object changes, and the degree of the change in barycenter may be calculated as the amount of change.

Further, the judgment unit 24 compares the amount of change thus acquired with a predetermined value set in advance, and judges whether the amount of change is equal to or larger than the predetermined value, to thereby judge whether there is any change equal to or greater than a predetermined amount among the images, that is, whether or not the display information covered with the transparent window has changed (Step S205). In other words, the judgment unit 24 compares the amount of change such as the difference in pixel information or an amount of movement of an object between the images, which is acquired in Step S204, with a predetermined value set in advance, to thereby judge whether or not there is a change in pixels or a movement of an object to a degree that may be judged as a change among the images. In the manner as described above, a threshold value is provided for determining a change, to thereby avoid erroneously detecting a trace amount of change caused by a camera shake or the like. In a case where it is judged that a change has reached a predetermined amount of change, the process proceeds to Step S206. In a case where it is judged that there has been no change or the change does not reach a predetermined amount of change, the processing proceeds to Step S202.

In Step S206, it is notified that a change has been detected. The judgment unit 24 notifies the processing execution unit 28 of a judgment result in Step S205 that the change has reached a predetermined amount of change, to thereby notify that the change has been detected, that is, the processing execution condition has been satisfied. Then, the processing proceeds to Step S202.

That is, in the processing illustrated in the flow chart, the processing from Steps S202 to S206 is repeated to acquire an image for every fixed time, to thereby continue the monitoring of the display information covered with the transparent window. It is possible to detect a change more instantly as the predetermined period of time for monitoring is set shorter, whereas the load to be imposed on the information processing device 1 increases. Therefore, it is preferred that the predetermined period of time for monitoring be appropriately set according to the processing capacity or a load status of the information processing device 1.

According to the embodiment described above, it is possible to allow the user to visually recognize the relation between the function to be provided by using a display element such as a window and display information to be used for processing to be performed for providing the function. Meanwhile, heretofore, in order to use a function that has not been provided to an application, it has been necessary to newly provide the function to the application or to install an application already provided with the function. On the other hand, according to the present invention, it is possible to provide a search function or a monitoring function, without additionally providing the application itself with the function or installing a new application.

Further, the transparent window according to this embodiment may be used for a purpose other than the purpose of monitoring a moving image. For example, the transparent window according to this embodiment may be used for search processing. In this case, the judgment unit 24 judges, with respect to information acquired as a result of search processing based on a search character string which is set by a user and included in a search query, whether or not the information includes the search character string thus set. Then, the display position acquisition unit 26 acquires the display position of the retrieved character string thus acquired. For example, in a case where information provided for the search includes information converted into textual information by using a character recognition technology, the position information which is associated with the information on the respective characters when the information is converted into the textual information may be used to acquire the display position of the retrieved character string. Alternatively, in a case where the information provided for the search includes information yet to be rendered as an image, it is possible to specify the display positions of the respective character information items as described in Step S201, and therefore it is possible to acquire the display position of the retrieved character string based on the position information on the respective characters included in the retrieved character string.

Also, in the case where the processing execution condition is satisfied, the transparent window related to the condition may be highlighted. For example, the display contents changing unit 25 identifies, based on the display position information acquired with respect to the retrieved character string, a portion overlapping the retrieved character string in the transparent window, and changes the color information on the portion, to thereby highlight the retrieved character string so as to be easily spotted by the user. On the display 2, various display information items including a character string and graphics are displayed, and a transparent window is also displayed. Then, the transparent window is partially adjusted in color information thereof so as to highlight the retrieved character string included in a display information item of the display information items, the display information item having in front thereof the transparent portion of the transparent window. Of the transparent window, a portion overlapping the retrieved character string may be changed in color so as to be displayed in a prominent color such as a transparent red or a transparent yellow. Alternatively, there may be employed another method of highlighting the retrieved character string by framing the retrieved character string, or by displaying a line at a position so as to make as if the retrieved character string is underlined.

It should be noted that, according to this embodiment, a single transparent window may be provided with a plurality of conditions set thereto, the plurality of conditions each being for causing the processing execution unit 28 to execute predetermined processing. Alternatively, transparent windows provided with different conditions set thereto may be superimposed on a region, and in the region on which the transparent windows are thus superimposed, the condition for executing processing may be determined as, for example, a logical product (AND condition) or a logical sum (OR condition) of the conditions set to all the windows overlapping one another. With this configuration, there may be created, in advance, definitions of the transparent windows provided with different conditions set thereto, which are frequently used, and the transparent windows are used as being superimposed on one another, to thereby eliminate the need for defining a transparent window provided with a new condition to be set thereto every time a complicated condition becomes necessary, making it significantly easy to provide a function which otherwise necessitates a complicated conditional judgment.

Figure 6:
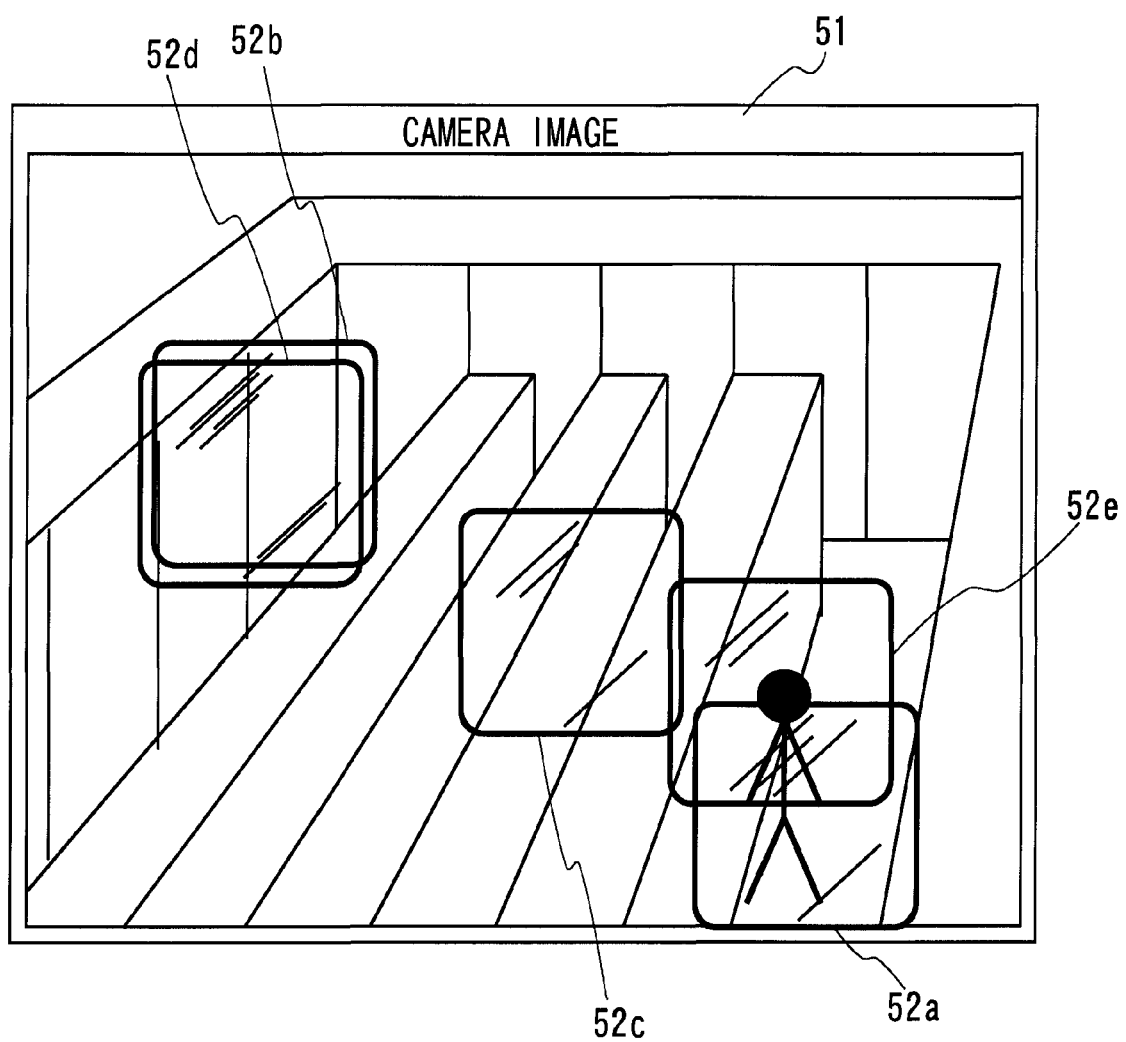
FIG. 6 is a diagram illustrating a state where a plurality of transparent windows for sales floor provided with different conditions are used as being superimposed on one another in the embodiment of the present invention.

FIG. 6 is a diagram illustrating a state where a plurality of the transparent windows for sales floor provided with different conditions set thereto are used as being superimposed on one another in this embodiment. In FIG. 6, the transparent windows provided with different processing execution conditions set thereto are superimposed on a region, and in a region on which the transparent windows are thus superimposed, there is determined a logical product of the processing execution conditions set to the respective transparent windows overlapping one another, to thereby determine the processing execution condition. That is, in a region on which two of the transparent windows for sales floor 52b and 52d overlap each other, the processing of additionally providing information to the list of articles for sale interested, which is the condition set to the transparent window for person 52e, is not executed unless the transparent window for person 52e is superimposed on the region and both of the processing execution conditions set to the transparent windows for sales floor 52b and 52d are satisfied as well. Though a description is given herein of a case where two of the transparent windows are used as being superimposed on a region, there may be used three or more transparent windows to be superimposed on a region.

Further, according to this embodiment, there is provided a function of attaining a complicated conditional judgment by superimposing the transparent windows on one another, and hence it is necessary to adjust the relative display positions of the plurality of the transparent windows. For this reason, even in a case where the display positions of the transparent windows overlapping one another are once adjusted to be in an ideal state, there is a fear that it becomes necessary to adjust again the display positions of the windows altogether if any one of the plurality of the transparent windows overlapping one another is later changed in display position. To solve this problem, the information processing device 1 that executes the transparent display element control program according to this embodiment is provided with a function of locking the transparent windows, in order to align the display positions among the transparent windows in a predetermined relation (for example, to be in the completely same position). The application of the function of locking the transparent windows described above is not limited to the windows which are similar to one another in shape and size. The function may also be applied to windows which are different from one another in shape and size.

According to this embodiment, the transparent windows are assigned window identifiers or the like, which are managed by a management table for the windows, and the window identifiers are associated with one another, whereby it is determined whether or not the transparent windows are targets to be locked in position with respect to one another. That is, according to this embodiment, when the transparent windows which have been associated with one another in advance as targets to be locked have overlapped one another, the relative display position fixing unit 29 holds the relative relation of the display positions among the overlapping windows. When the windows overlap one another, the relative display position fixing unit 29 correlates or subordinates the contents of the display position information associated with at least one of the transparent windows to the contents of the display position information associated with another one of the transparent windows, to thereby hold the relative relation of the display positions of the overlapping windows.

More specifically, there may be employed a method of updating the display position information in which, in a case where the display position of any one of the transparent windows has been moved, the display positions of the rest of the transparent windows as targets to be fixed are also moved in the same direction by the same distance. There may be employed another method in which a master-subordinate relation is set among the transparent windows, and a transparent window as a subordinate holds, as the display position information, relative position information with respect to a transparent window as a master, whereby the display position of the subordinate transparent window is determined with reference to the display position information of the master transparent window. Other than those methods, there may be appropriately employed various methods, according to the embodiments, for holding the relative positional relation among the windows.

Figure 7:
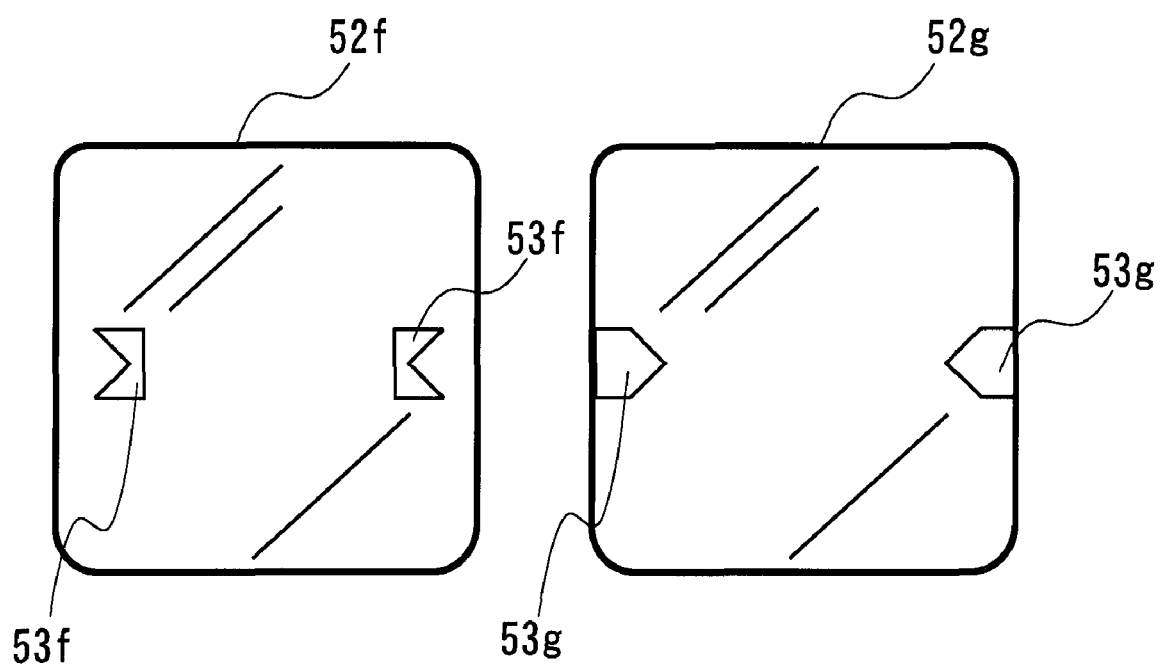
FIG. 7 is a diagram illustrating transparent windows which are capable of being locked according to the embodiment of the present invention.
Figure 8:
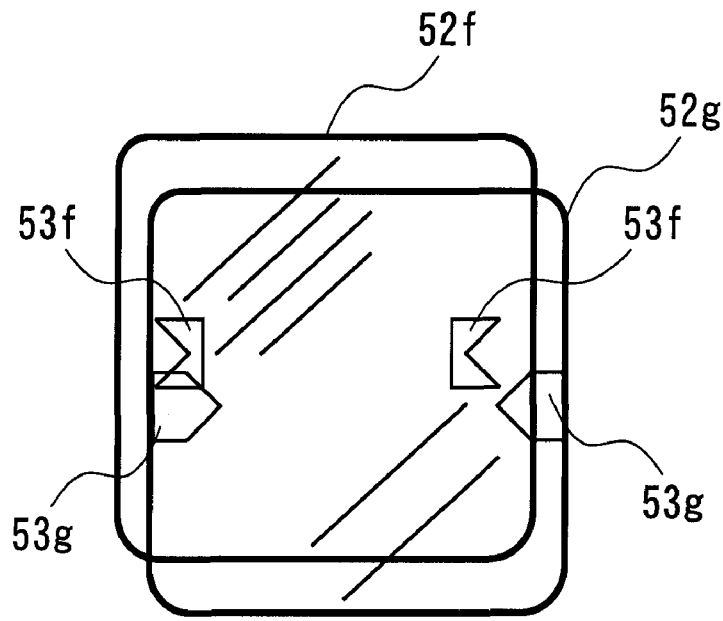
FIG. 8 is a diagram illustrating a transition of a display content in a case where the display positions of the transparent windows capable of being locked are moved and the relative display positions thereof are locked in a state where the transparent windows are completely superimposed on each other.
Figure 8:
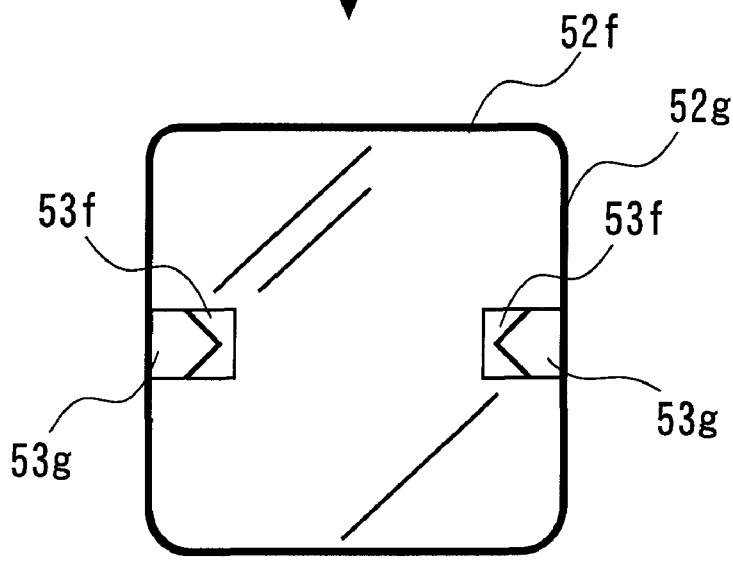

Further, in this embodiment, the transparent windows as targets to be locked by the locking function may have a shape or may be attached a mark or the like which indicates that the windows are capable of being locked with one another. FIG. 7 is a diagram illustrating transparent windows 52f and 52g which are capable of being locked according to this embodiment. FIG. 8 is a diagram illustrating a transition of a display content in a case where the display positions of the transparent windows 52f and 52g capable of being locked are moved and the relative display positions thereof are locked in a state where the transparent windows 52f and 52g are completely superimposed on each other. The transparent windows are provided with indicators for registration (register portions) 53f and 53g. The register portions 53f and 53g are in shapes which coincide with each other in display position when overlapped with each other at a predetermined position or complement each other when overlapped with each other at a predetermined position. The register portions 53f and 53g in the shape as described above, which are provided to the transparent windows intended to be overlapped with one another for use, allow the user to intuitively understand that the transparent windows are to be overlapped with one another for use. The user uses an input device such as a mouse to drag one of the transparent windows 52f and 52g displayed on the display 2 to the other one of the transparent windows 52f and 52g, such that the register portions 53f and 53g fit in each other.

In a case where the display positions of a plurality of transparent windows are desired to completely coincide with one another, it is difficult to align the display positions of the plurality of the transparent windows to a complete match in units of pixels of the display 2 through an input device such as a mouse, and the user has to perform a complicated operation when the display positions of the transparent windows need to be designated on the display 2 based on coordinates or the like. For this reason, the positions of the windows may be automatically corrected to a predetermined positional relation (in the case of the transparent windows provided with the register portions, the positional relation in which the register portions of the transparent windows fit in with one another) and locked in the position, when the windows have overlapped one another over a predetermined area or more or when a deviation of the display positions of the windows becomes equal to or smaller than a predetermined value.

Specifically, the information processing device 1 that executes the transparent display element control program monitors the positional relation among the plurality of the transparent windows which have the window identifiers associated with one another and hence are intended to be overlapped with one another, and detects, as a result of the monitoring, that the windows have moved closer to one another across a predetermined distance or less. When it is detected that the windows have moved closer to one another across a predetermined distance or less, the transparent display element display unit 21 updates the display position of one or more of the transparent windows in proximity to one another to a predetermined positional relation (in the case of the transparent windows provided with the register portions, the positional relation in which the register portions of the transparent windows coincide with one another). With this configuration, when the user brings the transparent windows closer to one another across a predetermined distance through an operation of a mouse or the like, the transparent windows are easily moved to accurate positions with respect to the relative positions to be locked with each other, giving the user such an operational feeling as if the transparent windows are drawn to one another to be fit into the predetermined positions. According to the example illustrated in FIG. 8, when the transparent windows are moved closer to each other through a user operation to be in a state illustrated in the upper diagram of FIG. 8, the transparent display element display unit 21 automatically adjusts the display positions, to thereby bring the display positions of the transparent windows to a state illustrated in the lower diagram of FIG. 8.

With regard to the embodiment described above, it has been described that a logical product or a logical sum of the conditions set to the transparent windows determines the condition in the case where the transparent windows are overlapped with one another. In a case where the transparent windows overlapped with one another include windows that executes processing accompanied by a certain input and output, the overlapping windows may exchange data (parameter corresponding to an argument to a function) with one another. When the windows are provided with a function of exchanging data as described above, the transparent windows provided with different functions may be overlapped with one another and combined as software modules, thereby making it possible to easily provide a complicated function in a visually recognizable manner.

A specific method of exchanging data among the transparent windows may include a method of exchanging data on a memory among functions associated with the transparent windows which have been detected as being overlapped with one another. Moreover, there may be another method, in which data is exchanged by using display information in the transparent windows. For example, when two transparent windows are superimposed on each other, one of the transparent windows laid below the other transparent window is provided with a function of displaying a predetermined mark (such as a red circle) upon detecting a change in the display information covered with the transparent window, while the other transparent window laid over the transparent window is provided with a function of incrementing a predetermined variable upon detecting that the predetermined mark is displayed in the region covered with the other transparent window. In a state where the transparent windows each provided with the function as described above are overlapped with one another, the transparent window laid below the other one, which detects a change in display information, displays a predetermined mark to be detected, to thereby cause the transparent window laid above to increment a predetermined variable. In this case, the specific details of the processing for changing the display of the transparent window upon detection of a change in the display information and for incrementing a variable have been described with reference to the flow charts of FIGS. 2 and 5. In the manner as described above, the transparent windows which are associated in function with one another are overlapped with one another to exchange data, to thereby provide a complicated function through a simple operation. The data thus exchanged is referred to when executing functions (software modules) associated with the respective transparent windows.

Figure 9:
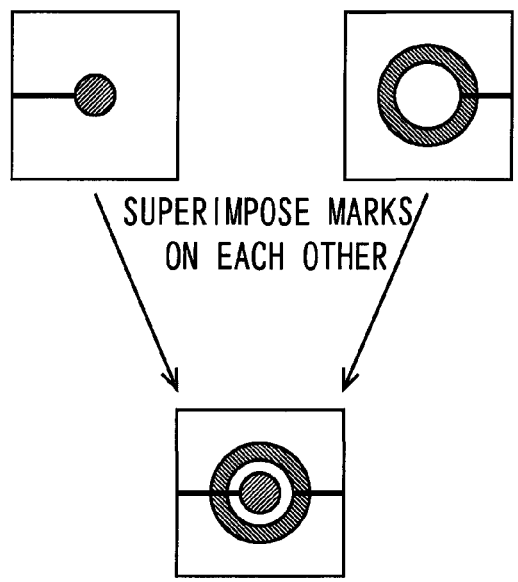
FIG. 9 is a diagram illustrating an example of a mark attached to a combination of the transparent windows capable of exchanging data with each other.

In the case where the transparent windows are provided with the function of exchanging data as described above, the respective transparent windows may preferably provide a display for allowing a user to visually recognize whether the transparent windows are capable of exchanging data when overlapped with one another, in other words, a display for allowing the user to visually recognize a coordination possibility of the transparent windows. FIG. 9 is a diagram illustrating an example of a mark attached to a combination of the transparent windows capable of exchanging data with each other. As illustrated in FIG. 9, the transparent windows capable of exchanging data are provided with marks which are designed to constitute a balanced symbol when overlapped with each other to be combined. Such a mark as described above may be attached with a meaning by the color or shape thereof for indicating information regarding the exchange of data. For example, the data type (for example, a character type or a number type) may be indicated by the color of the mark, while the shape of the mark may indicate whether the transparent window is for receiving an input of data or outputting data.

Figure 10:
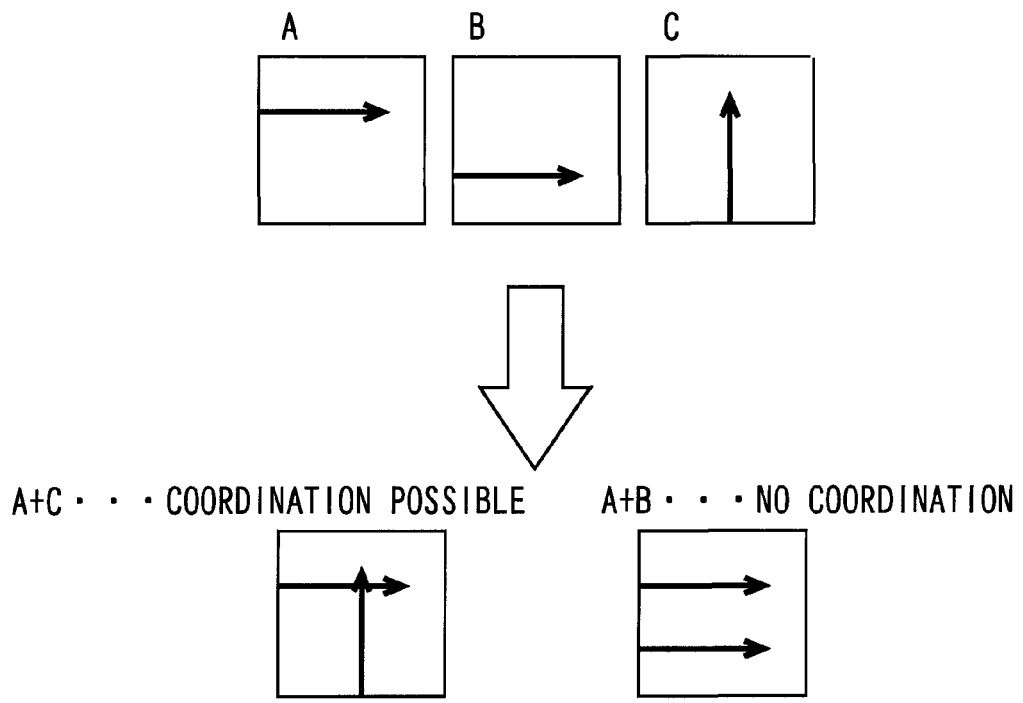
FIG. 10 is a diagram illustrating another specific example of a mark for indicating a coordination possibility between the transparent windows.

FIG. 10 is a diagram illustrating another specific example of a mark for indicating a coordination possibility among the transparent windows. In the example illustrated in FIG. 10, the coordination possibility among the transparent windows is indicated by an intersection of marks in an arrow shape. That is, the transparent windows provided with marks A and C, respectively, which are arrows intersecting with each other are capable of being coordinated with each other, while the transparent windows provided with marks A and B, respectively, which are arrows not intersecting with each other (in parallel with each other) cannot be coordinated with each other. The direction and length of the arrow of the mark may be changed by the user by using a mouse or the like. For example, when the input reception unit 23 has received a click in the lower left of the mark, the display contents changing unit 25 may change the length of the arrow. When the input reception unit 23 has received a click in the lower right of the mark, the display contents changing unit 25 may change the direction of the arrow.

Figure 11:
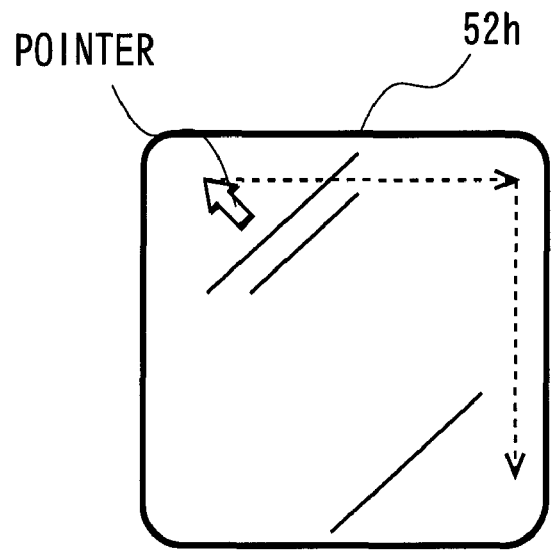
FIG. 11 is a diagram for illustrating an operation procedure in a case of displaying a mark of a transparent window through a so-called gestural manipulation.
Figure 12:
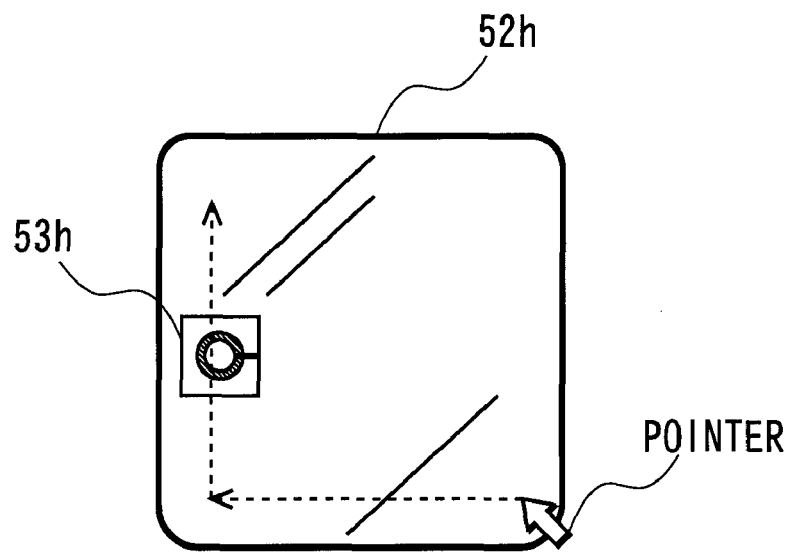
FIG. 12 is a diagram for illustrating an operation procedure in a case of hiding a mark of a transparent window through the so-called gestural manipulation.

The mark or the like displayed on the transparent window may be hidden. With this configuration, the mark may be displayed only when disposing the transparent window, and the marks may be hidden after the disposition of the transparent window is completed, whereby the display information covered with the transparent window can be visually recognized without being interrupted by the mark. Here, as a method of disabling and enabling the showing of the mark or the like of the transparent window, there may be employed various known methods depending on the embodiment. FIGS. 11 and 12 each are a diagram for illustrating an operation procedure in a case of disabling and enabling the showing of a mark of a transparent window through a so-called gestural manipulation. The input reception unit 23 detects a pointer operation made by using a mouse or the like to draw a predetermined trajectory in a region where the transparent window is displayed, to thereby receive an input of an operation of enabling and disabling the showing of the mark. When the operation as described above is received, the display contents changing unit 25 enables or disables the showing of the mark or the like. FIG. 11 illustrates an exemplary case where the mark is displayed when the pointer is moved so as to trace the upper right corner (trajectory indicated by the dashed line in the drawing) of the transparent window, and FIG. 12 illustrates another exemplary case where the mark is hidden when the pointer is moved so as to trace the lower left corner (trajectory indicated by the dashed line in the drawing) of the transparent window.

The display position of the mark or the like displayed on the transparent window may be changed. With this configuration, display information covered with the transparent window may be identified even with the mark or the like being displayed. To change the display position of the mark or the like, a so-called drag and drop operation may be performed, or a so-called gestural operation, which is also employed in the case of enabling and disabling the showing of the mark or the like described above, may be performed. For example, when the input reception unit 23 receives a double-click operation on the upper right corner of the transparent window, the display contents changing unit 25 displays the mark or the like in a manner that the mark or the like moves on the transparent window in a clockwise direction, and when the input reception unit 23 receives a double-click operation on the lower left corner of the transparent window, the display contents changing unit 25 displays the mark or the like in a manner that the mark or the like moves on the transparent window in a counter-clockwise direction.

What is claimed is:

1. An information processing device which is connected to a display device and displays display information on the display device, the display information being associated with display position information for specifying a display position in a display area of the display device, the information processing device comprising:

transparent display element display means for displaying a plurality of transparent display elements on the display device in association with display position information for specifying a display position for each of the plurality of transparent display elements in the display area, the plurality of transparent display elements comprising display elements each displayed on a portion of the display area as being transparent at least in part such that display information items covered with the display elements are visually recognized through the display elements;

information acquisition means for acquiring, of the display information items displayed on the display area, a display information item covered with any one of the plurality of transparent display elements, based on the display position information of the display information item and the display position information of the any one of the plurality of transparent display elements;

superimposition detection means for detecting that the plurality of transparent display elements displayed by the transparent display element display means are in a positional relation where the plurality of transparent display elements are displayed as being superimposed on one another in the display area, based on the display position information associated with each of the plurality of transparent display elements; and processing execution means for executing predetermined processing by using a display information item of the display information items, which is acquired by the information acquisition means, the display information item being covered with at least one of the plurality of transparent display elements, in a case where the superimposition detection means detects that the plurality of transparent display elements are in the positional relation where the plurality of transparent display elements are displayed as being superimposed on one another in the display area.

2. An information processing device according to claim 1, wherein the predetermined processing executed by the processing execution means is determined based on a combination of the plurality of transparent display elements which are detected as being superimposed on one another by the superimposition detection means.

3. An information processing device according to claim 1, further comprising judgment means for judging whether or not a processing execution condition is satisfied based on the display information item acquired by the information acquisition means, the processing execution condition being set to at least one of the plurality of transparent display elements which are detected by the superimposition detection means as being in the positional relation where the plurality of transparent display elements are displayed as being superimposed on one another, wherein the processing execution means executes the predetermined processing in a case where the superimposition detection means detects that the plurality of transparent display elements are in the positional relation where the plurality of transparent display elements are displayed as being superimposed on one another, and further the judgment means judges that the processing execution condition is satisfied.

4. An information processing device according to claim 3, wherein the judgment means judges that the processing execution condition is satisfied in a case where it is judged that the display information items covered with the plurality of transparent display elements change.

5. An information processing device according to claim 4, wherein:

the information acquisition means periodically acquires the display information items covered with the plurality of transparent display elements; and the judgment means judges whether or not the display information items covered with the plurality of transparent display elements change, by drawing a comparison in a chronological order among the display information items acquired by the information acquisition means.

6. An information processing device according to claim 5, wherein the judgment means judges that the display information items covered with the plurality of transparent display elements change, in a case where an amount of change obtained as a result of the comparison is equal to or larger than a predetermined reference value.

7. An information processing device according to claim 1, wherein the information acquisition means acquires one of the display information items covered with the at least one of the plurality of transparent display elements, by extracting, from the display information items displayed on the display area, a display information item which has a display position specified based on the display position information associated with the display information item, the display position overlapping a display position specified based on the display position information associated with the at least one of the plurality of transparent display elements.

8. An information processing device according to claim 1, wherein the processing execution means executes the predetermined processing by using a display information item covered with at least two of the plurality of transparent display elements, the display information item being acquired by the information acquisition means.

9. An information processing device according to claim 1, further comprising relative display position fixing means for maintaining constant relative display positions among the plurality of transparent display elements in the display area, the plurality of transparent display elements being displayed by the transparent display element display means.

10. An information processing device according to claim 9, wherein the relative display position fixing means maintains, in a case where the superimposition detection means detects that the plurality of transparent display elements are in the positional relation where the plurality of transparent display elements are displayed as being superimposed on one another, the constant relative display positions among the plurality of transparent display elements displayed as being superimposed on one another in the display area.

11. An information processing device according to claim 1, wherein the each of the plurality of transparent display elements displayed by the transparent display element display means comprises a register portion which is used for registration in a case where the plurality of transparent display elements are displayed as being superimposed on one another.

12. A transparent display element control method executed by a computer which is connected to a display device and displays display information on the display device, the display information being associated with display position information for specifying a display position in a display area of the display device, the transparent display element control method comprising:

displaying a plurality of transparent display elements on the display device in association with display position information for specifying a display position for each of the plurality of transparent display elements in the display area, the plurality of transparent display elements comprising display elements each displayed on a portion of the display area as being transparent at least in part such that display information items covered with the display elements are visually recognized through the display elements;

acquiring, of the display information items displayed on the display area, a display information item covered with any one of the plurality of transparent display elements, based on the display position information of the display information item and the display position information of the any one of the plurality of transparent display elements;

detecting that the plurality of transparent display elements displayed in the displaying are in a positional relation where the plurality of transparent display elements are displayed as being superimposed on one another in the display area, based on the display position information associated with each of the plurality of transparent display elements; and executing predetermined processing by using a display information item of the display information items, which is acquired in the acquiring, the display information item being covered with at least one of the plurality of transparent display elements, in a case where it is detected, in the detecting, that the plurality of transparent display elements are in the positional relation where the plurality of transparent display elements are displayed as being superimposed on one another in the display area.

13. A readable-by-computer recording medium recorded with a transparent display element control program for a computer which is connected to a display device and displays display information on the display device, the display information being associated with display position information for specifying a display position in a display area of the display device, the transparent display element control program causing the computer to function as:

transparent display element display means for displaying a plurality of transparent display elements on the display device in association with display position information for specifying a display position for each of the plurality of transparent display elements in the display area, the plurality of transparent display elements comprising display elements each displayed on a portion of the display area as being transparent at least in part such that display information items covered with the display elements are visually recognized through the display elements;

information acquisition means for acquiring, of the display information items displayed on the display area, a display information item covered with any one of the plurality of transparent display elements, based on the display position information of the display information item and the display position information of the any one of the plurality of transparent display elements;

superimposition detection means for detecting that the plurality of transparent display elements displayed by the transparent display element display means are in a positional relation where the plurality of transparent display elements are displayed as being superimposed on one another in the display area, based on the display position information associated with each of the plurality of transparent display elements; and processing execution means for executing predetermined processing by using a display information item of the display information items, which is acquired by the information acquisition means, the display information item being covered with at least one of the plurality of transparent display elements, in a case where the superimposition detection means detects that the plurality of transparent display elements are in the positional relation where the plurality of transparent display elements are displayed as being superimposed on one another in the display area.

* * * * *